US006204909B1

(12) United States Patent
Jung et al.

(10) Patent No.: US 6,204,909 B1
(45) Date of Patent: Mar. 20, 2001

(54) LIQUID CRYSTAL INJECTOR FOR A LIQUID CRYSTAL DISPLAY AND METHOD THEREOF HAVING A STAND WITH FURROWS

(75) Inventors: Sung-Uk Jung; Ki-Chul Shin, both of Seoul; Bum-Soo Kam, Kyungki-do, all of (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/119,928

(22) Filed: Jul. 21, 1998

(30) Foreign Application Priority Data

Jul. 23, 1997 (KR) ................................. 97-34426

(51) Int. Cl.$^7$ ........................ G02F 1/1341; B65B 31/00
(52) U.S. Cl. .............................. 349/189; 141/5
(58) Field of Search ............... 141/4, 5, 7; 349/187, 349/189

(56) References Cited

U.S. PATENT DOCUMENTS

| 5,359,442 | * | 10/1994 | Tanaka et al. | 349/189 |
| 5,659,377 | * | 8/1997 | Dabbagh et al. | 349/84 |
| 5,862,839 | * | 1/1999 | Nakamura et al. | 349/154 |
| 5,895,107 | * | 4/1999 | Haslam | 349/172 |

* cited by examiner

Primary Examiner—Walter J. Malinowski
(74) Attorney, Agent, or Firm—Myers Bigel Sibley & Sajovec

(57) ABSTRACT

A device and method for injecting liquid crystal material into a liquid crystal cell. The device includes a container for holding the liquid crystal material and a stand disposed in the container. The stand has an upper surface and at least one side having a plurality of furrows formed therein. The liquid crystal material is transported by capillary action to the upper surface where it is contacted with an injection hole of the cell. The method provides for removal of air from the liquid crystal material and injection of the liquid crystal material in an isotropic state.

39 Claims, 9 Drawing Sheets

LIQUID CRYSTAL INJECTOR FOR A LIQUID CRYSTAL DISPLAY AND METHOD THEREOF HAVING A STAND WITH FURROWS

FIELD OF THE INVENTION

The present invention relates to a liquid crystal injector for a liquid crystal display and a method using the same.

BACKGROUND OF THE INVENTION

Generally, a conventional liquid crystal display (LCD) comprises two substrates having electrodes facing each other and liquid crystal material disposed therebetween. In manufacturing the liquid crystal display, the two substrates are combined to define a vacant liquid crystal cell therebetween. The liquid crystal material is thereafter injected into the vacant cell.

Conventionally, the liquid crystal material is prepared and injected into the vacant cells in the following manner. First, the liquid crystal material is placed in a container. Next, the container and vacant liquid crystal cells are placed in a vacuum chamber. The pressure of the chamber is maintained in a high vacuum state of $10^{-4}$ torr to $10^{-5}$ torr, whereby air bubbles formed within the liquid crystal material or inside the container are removed.

A liquid crystal injection hole of the vacant crystal cell is dipped into or touched with the liquid crystal material disposed in the container while keeping the pressure of the chamber in a high vacuum state of $10^{-4}$ torr to $10^{-5}$ torr. By raising the pressure in the chamber from the vacuum state to normal atmospheric pressure, the liquid crystal material is injected through the liquid crystal injection hole by the pressure differential between the vacant liquid crystal cell and the chamber.

There are two well-known methods for injecting the liquid crystal material into the vacant liquid crystal cell: a dipping method and a touch method. Hereinafter, the two methods are explained with reference to FIGS. 1 and 2, respectively.

With reference to FIG. 1, in practicing the dipping method, a substantial quantity of liquid crystal material 4 is present in the container 1. The injection hole 3 of the vacant liquid crystal cell 2 is deeply dipped in the liquid crystal material 4. The amount of the liquid crystal material used for one dipping process is about 100 cc, substantially more than is necessary to fill the vacant cell. The remaining liquid crystal material cannot be used for another dipping process because the remaining liquid crystal material may be contaminated.

As described above, the dipping method can be disadvantageous in that a substantial amount of liquid crystal material is wasted because the liquid crystal material is easily polluted. Also, an alignment film doped at the injection hole 3 of the liquid crystal cell 2 may be damaged by overly rapid injection of the liquid crystal material into the liquid crystal cell.

With reference to FIG. 2, in practicing the touch method, the liquid crystal material 4 is injected into the liquid crystal cell 2 by placing a relatively small amount of liquid crystal material 4 in a slightly protruded border 5 formed on the container 1. The surface of the liquid crystal material 4 protrudes or bulges upwardly due to surface tension. The injection hole 3 of the vacant liquid crystal cell 2 is placed in contact with or touched to the protruded surface of the liquid crystal material, whereby the liquid crystal material 4 is injected into the injection hole 3.

The conventional touch method can be advantageous as compared to the dipping method in that the liquid crystal material is not overly wasted because a relatively small amount of liquid crystal material is put in the container 1 for injection. However, the conventional touch method can have disadvantages. Because the surface tension of the liquid crystal material to be injected differs according to, inter alia, the kind of liquid crystal material being injected and the vacuum state, the structure of the container 1, the amount of the liquid crystal material 4 to be placed in the container, and the vacuum state must be carefully controlled. In addition, the amount of the liquid crystal material should be controlled according to the number of liquid crystal cells to be injected at a time.

A further problem experienced in practicing the aforedescribed methods is that a number of air bubbles are produced during the high vacuum state of the air removal step. Often several of these air bubbles reach the surface of the liquid crystal material and combine to make a larger air bubble. The larger air bubble tends to burst, displacing the liquid crystal material beyond the container 1 and thereby resulting in waste of the liquid crystal material.

To overcome the above-mentioned disadvantages, a method for gradually raising the vacuum has been suggested. However, this method has a disadvantage in that it substantially increases the amount of time required to perform the method.

SUMMARY OF THE INVENTION

An object of the present invention is to provide a liquid crystal material injection device which allows efficient and effective injection of liquid crystal material into a vacant cell while minimizing waste of the material due to contamination.

An object of the present invention is to provide such a device which may be employed without requiring careful control of the vacuum state, the amount of material and other factors depending upon the type of material to be injected.

A further object of the present invention is to provide a method for injecting liquid crystal material into a vacant cell without damaging an alignment film.

Another object of the present invention is to provide a method for removing air bubbles from a quantity of liquid crystal material which is to be injected into a vacant cell.

The present invention is directed to an apparatus and method for injecting liquid crystal material into a vacant liquid crystal cell. The apparatus and method provide a substantial reduction, as compared to the prior art, in the amount of wasted liquid crystal material. Also, the apparatus and method of the present invention prevent an alignment film doped on an injection hole of the liquid crystal cell from being damaged during the liquid crystal material injection process. Further, the apparatus and method provide for effective and convenient injection of the liquid crystal material into a vacant liquid crystal cell without requiring careful control of vacuum state and the amount of the liquid crystal material contained as a function of the type of liquid crystal material and other factors.

In a accordance with the present invention, a liquid crystal injection device using capillary action is employed. The device includes a four-cornered stand having narrow furrows formed in the sides thereof. The liquid crystal material, contacting lower parts of the side furrows, ascends the stand along the furrows to the upper surface of the stand by way of the capillary action. The upper surface of the four-cornered stand is flat and has a plurality of upper surface furrows connected to the side furrows. The upper surface furrows cross each other to form an interconnected, reticulated network of furrows so that the liquid crystal material may be uniformly dispersed even though the side furrows do not adjoin one another.

Preferably, the side furrows and the upper furrows of the four-cornered stand are saw-shaped in cross-section, and the end portions of the sections between the upper surface furrows are cut off or truncated to prevent the liquid crystal cell from being damaged.

Preferably, a height gap between the upper surface and the base of the four-cornered stand is less than 10 mm, and an angle formed by the sides and the base is between about 10° to 70°. In addition, it is preferable that the cross-sectional areas of the side furrows and the upper surface furrows are less than 2 mm².

In a preferred method according to the present invention, the four-cornered stand is fixed in a container containing the liquid crystal material by means of a projection formed in the container. The liquid crystal material is put into the container in which the four-cornered stand is held. The liquid crystal material ascends along the furrows as discussed above and accumulates on the top surface in the upper furrows. The container, the stand, the liquid crystal material and the vacant liquid crystal cell are put into a vacuum chamber, and the pressure of the vacuum chamber is lowered. The liquid crystal injection hole of the vacant liquid crystal cell is contacted with the liquid crystal material gathered together on the upper surface of the stand. By raising the pressure in the vacuum chamber, a pressure differential is created between the inside and the outside of the liquid crystal cell. The pressure differential causes the liquid crystal material gathered together on the upper surface of the four-cornered stand to be injected into the liquid crystal cell through the liquid crystal injection hole. The liquid crystal material contained in the container is continually supplied to the upper surface along the furrows while the injection process is performed.

Using the apparatus of the present invention, the liquid crystal material may be conveniently and effectively injected into the vacant liquid crystal cell because the amount of the liquid crystal material is not limited. It is not necessary to control the amount of the liquid crystal material according to the kind of the liquid crystal material and the vacuum state. In addition, unlike a dipping method, because the liquid crystal cell itself is not dipped in the liquid crystal material in the container and the liquid crystal contacts only the liquid crystal material coming up to the upper surface of the four-cornered, contamination does not readily occur and the liquid crystal material therefore is not wasted.

It has been found that, in the practice of the aforementioned method, damage to the alignment film doped on the liquid crystal cell can be reduced if one injects the liquid crystal material in an isotropic state of low viscosity. Also, it is preferable that the air bubbles in the liquid crystal material be removed before injecting the liquid crystal material. In a preferred embodiment of the present invention, the air bubbles in the liquid crystal material are removed from the liquid crystal material or the air bubbles are melted into the liquid crystal material by heating the liquid crystal material above the liquid crystal-isotropic transition temperature and keeping the liquid crystal material in the isotropic state for 30 to 90 minutes. The heating process may be performed using hot wires mounted in the container. Alternatively, the liquid crystal material may be heated in an oven.

After keeping the liquid crystal material in the isotropic state for a predetermined time, the liquid crystal material may be cooled below the liquid crystal-isotropic temperature or the liquid crystal material may be injected while in the isotropic state without the cooling step.

After the above-mentioned steps, the liquid crystal material is placed in the vacuum chamber and the solubility of air entrained in the liquid crystal material is reduced by creating a vacuum state in the vacuum chamber of $10^{-1}$ to $10^{-3}$ torr. The air bubbles in the liquid crystal material are thereby removed from the liquid crystal material by expanding the bulk of the air bubbles. Preferably, in order to prevent combining of several air bubbles, the liquid crystal material is vacuumized for between about 30 to 90 minutes. Time is saved and less liquid crystal material is wasted because the vacuum state used in the air removal step is relatively small.

Thereafter, the vacuum state of the vacuum chamber is set at about $10^{-4}$ torr. The liquid crystal material is then injected into the vacant liquid crystal cell.

If desired, the same vacuum chamber as used for removing the air may be used for injecting the liquid crystal material.

Additional objects and advantages of the present invention will be readily apparent to those of ordinary skill in the art from a reading of the description of the preferred embodiments which follows and by reference to the drawings.

DETAILED DESCRIPTION OF THE PREFERRED EMBODIMENTS

Figure 1:
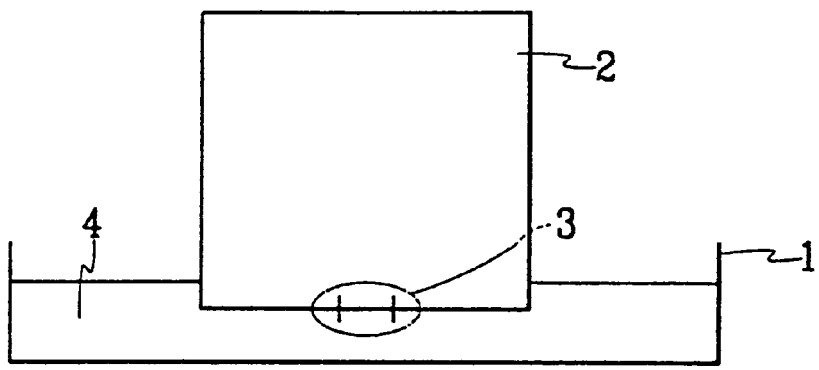
FIG. 1 is a schematic view of a dipping method according to a first prior art method for injecting liquid crystal into a vacant liquid crystal cell.
Figure 2:
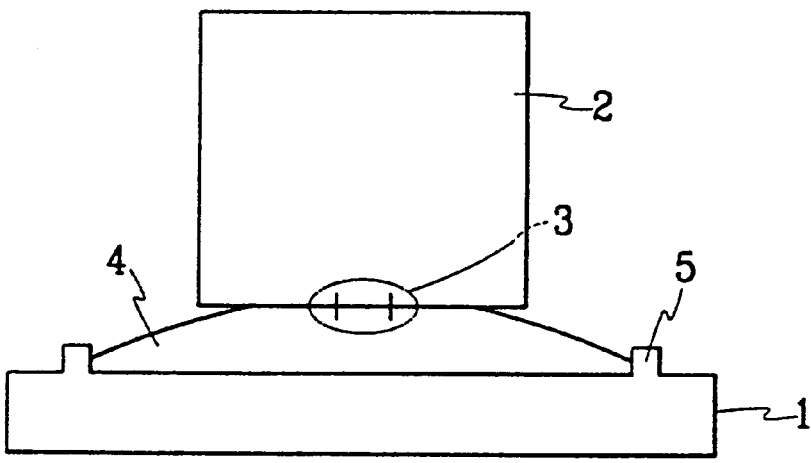
FIG. 2 is a schematic view of a touch method according to a second prior art method for injecting liquid crystal into a vacant liquid crystal cell.
Figure 3:
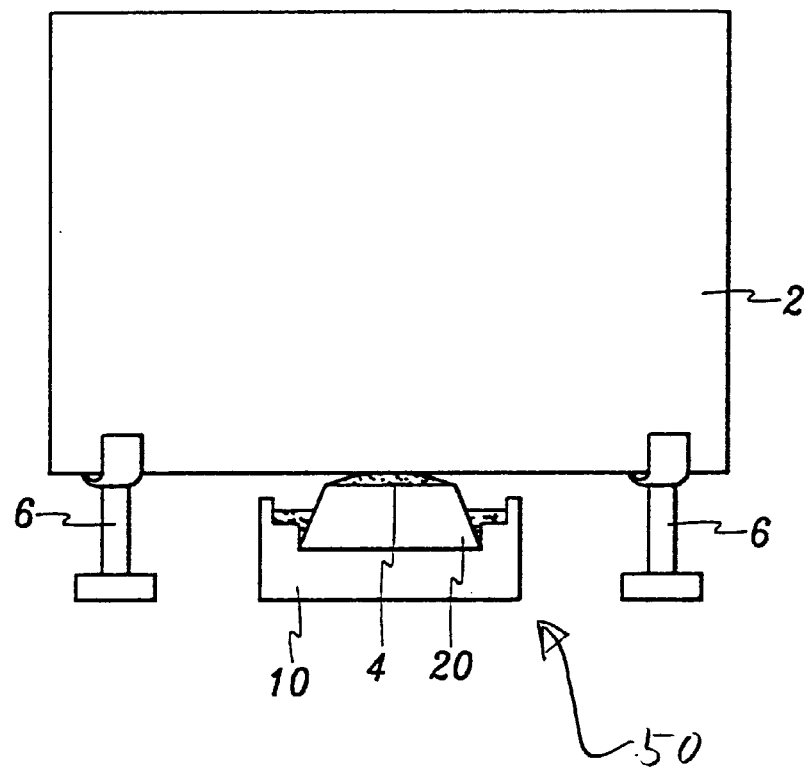
FIG. 3 is a schematic view of a liquid crystal injector according to a preferred embodiment of the present invention and a vacant liquid crystal cell.
Figure 4:
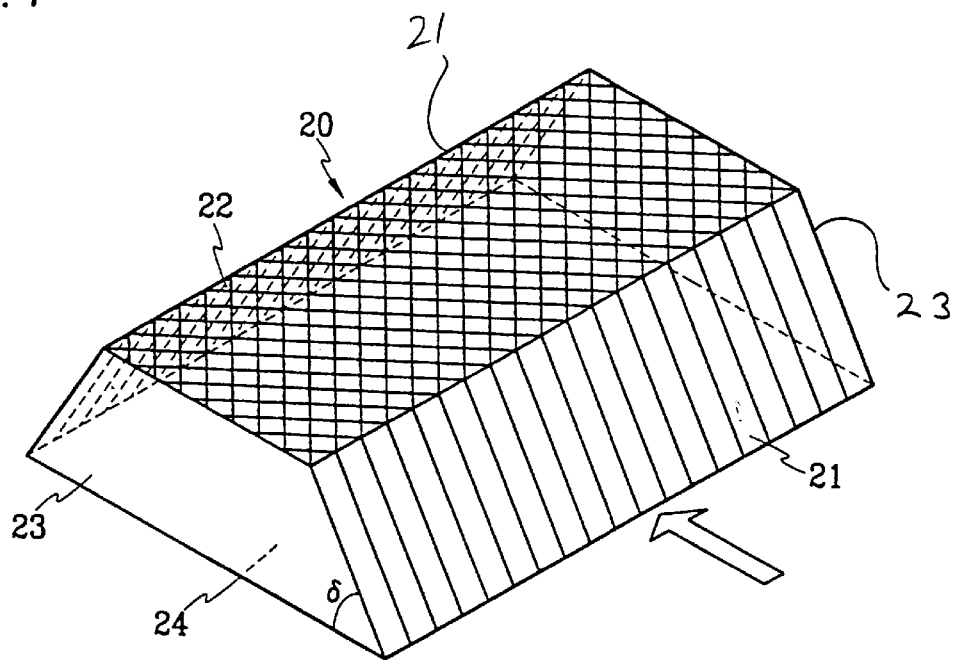
FIG. 4 is a perspective view of a stand forming a part of the liquid crystal injector according to the present invention.

With reference to FIGS. 3 to 4, a liquid crystal injector 50 according to the present invention is shown therein. Injector 50 is adapted to inject liquid crystal material into a vacant cell while overcoming various disadvantages of the afore-described conventional methods. Moreover, injector 50 may be used in methods of injecting liquid crystal material according to the present invention, such methods providing for effective and efficient injection of the material and preparation of the material for injection.

Referring to FIGS. 3 to 14, a liquid crystal material injector 50 according to a preferred embodiment of the present invention is shown therein. More particularly, FIG. 3 illustrates the injection of liquid crystal material 4 into vacant liquid crystal cell 2 using liquid crystal material injector 50. Injector 50 includes container 10 and four-cornered stand 20 which is placed in the bottom of container 10. Liquid crystal material is contained in container 10 such that it surrounds stand 20 and collects on an upper surface of stand 20 as described in more detail below. Liquid crystal cell 2 is supported by supporters 6 such that the injection hole of the cell contacts the liquid crystal material 4 disposed on the upper surface of four-cornered stand 20. As best seen in FIG. 4, four-cornered stand 20 has rectangular base 24 and rectangular top 22 which are flat and parallel with each other. Opposed sides 21 of the stand are rectangular and taper inwardly toward one another from base 24 to top 22. Opposed sides 23 are trapezoidal and parallel. Optionally, base 24 may be open such that a portion of the stand is hollow.

Figure 5:
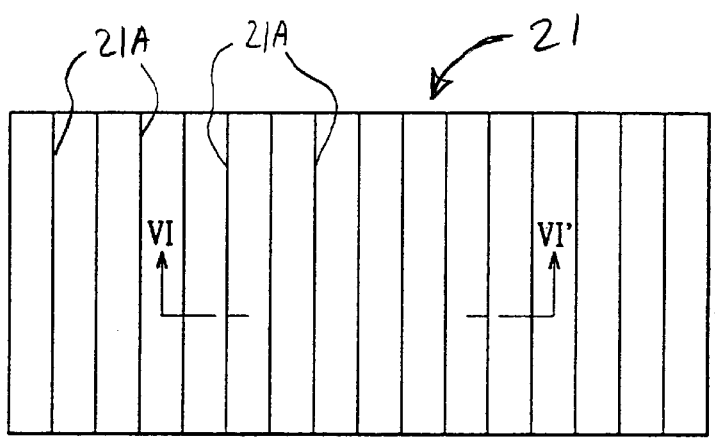
FIG. 5 is a plan view of the stand viewed from the direction indicated by the arrow in FIG. 4.
Figure 6:
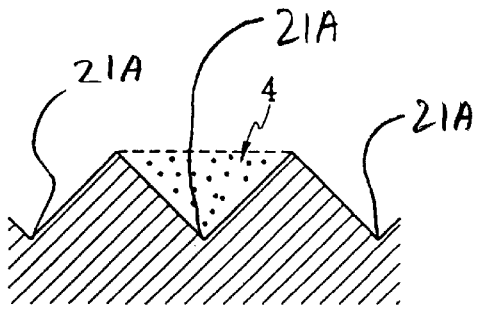
FIG. 6 is a cross-sectional view of the stand taken along line VI—VI' in FIG. 5.
Figure 6:
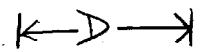

FIG. 5 is a front plan view of a side 21 of the four-cornered stand 20 as viewed from the direction indicated by an arrow in FIG. 4. FIG. 6 is a fragmentary, side sectional view taken along line VI—VI' in FIG. 5. A plurality of parallel, relatively narrow, adjacent furrows 21A are formed in each side 21 and extend between base 24 and top 22. Furrows 21A are straight from the base to the top and define a saw-shaped periphery as shown in FIG. 6. Preferably, furrows 21A are positioned immediately adjacent one another as shown in FIG. 6.

Figure 7:
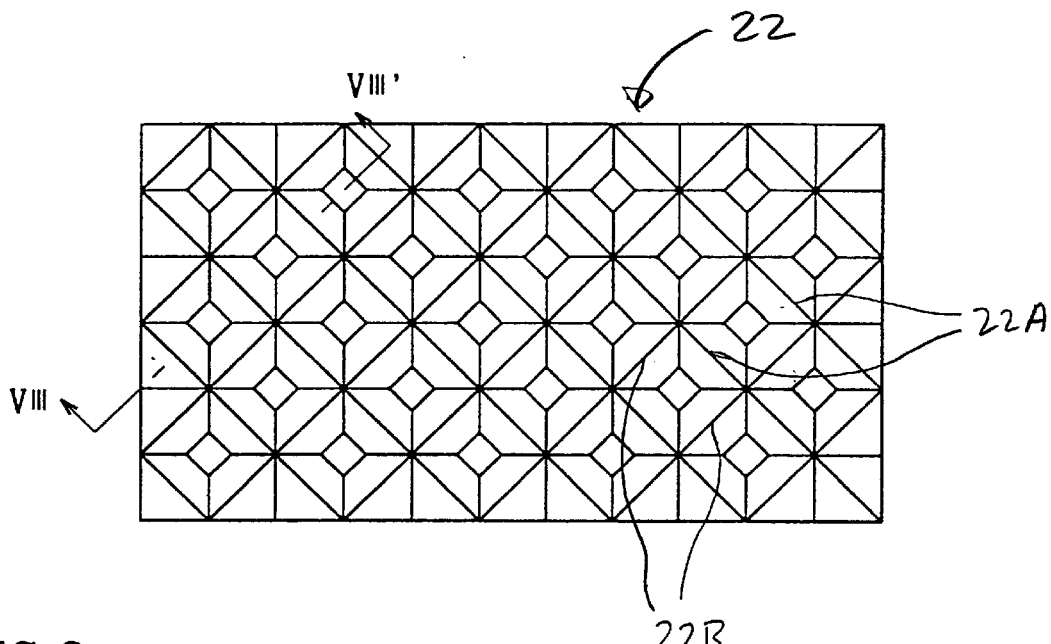
FIG. 7 is a top plan view of the stand in FIG. 4.
Figure 8:
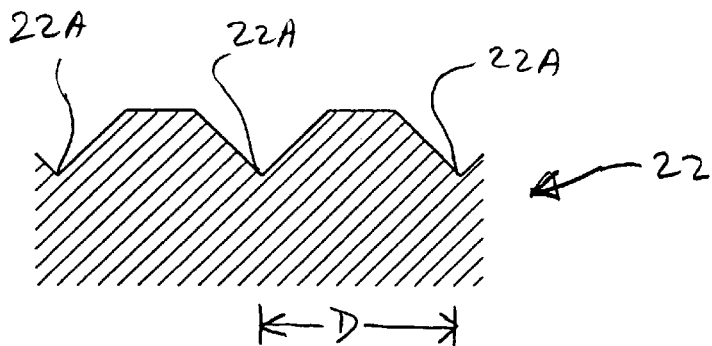
FIG. 8 is a partial, cross-sectional view of the stand taken along line VIII—VIII' in FIG. 7.

As illustrated in FIG. 7, top 22 is rectangular, and a plurality of linear, parallel furrows 22A are formed along a first direction and a plurality of linear, parallel furrows 22B are formed along a second direction. Furrows 22A define a saw-shaped periphery and furrows 22B also define a saw-shaped periphery. (See FIG. 8 which is a side sectional view taken along line VIII—VIII' in FIG. 7). Each linear furrow 22A, 22B is connected to a respective linear furrow of a side 21. Furrows 22A and 22B intersect to form a net-shaped, interconnected network of furrows which defines a plurality of pyramid-shaped protrusions. The points of the pyramid shaped protrusions are cut off (see FIG. 8) to prevent the liquid crystal cell 2 from being damaged when contacting top 22 during the injection procedure.

Figure 9:
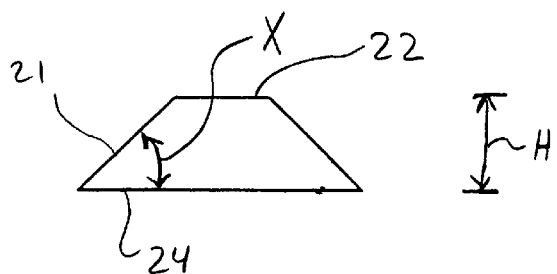
FIG. 9 is a side elevational view of the stand.
Figure 10:
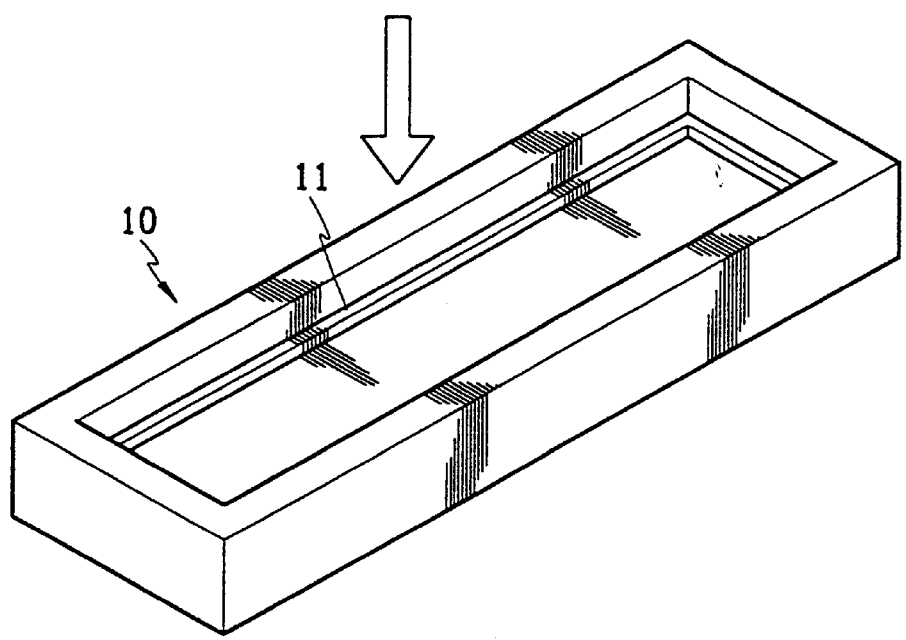
FIG. 10 is a perspective view of a container forming a part of the liquid crystal injector according to the present invention.
Figure 11:
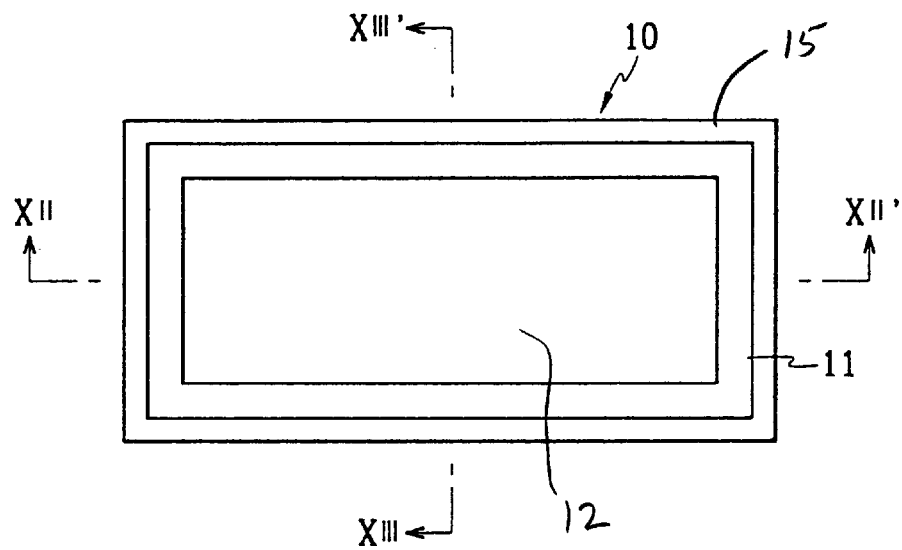
FIG. 11 is a top, plan view of the container viewed from the direction indicated by the arrow in FIG. 10.
Figure 12:
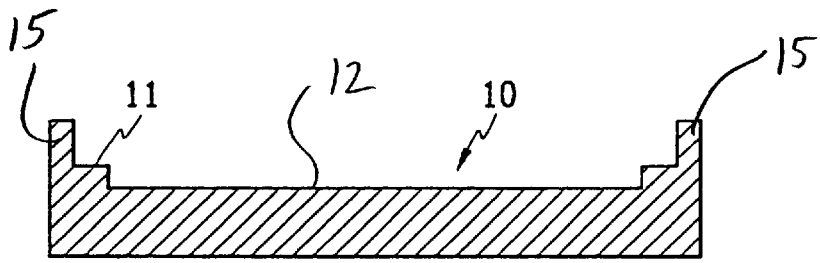
FIG. 12 is a cross-sectional view of the container taken along line XII—XII' in FIG. 11.
Figure 13:
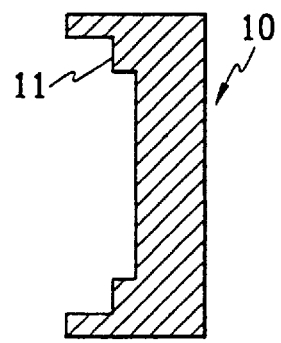
FIG. 13 is a cross-sectional view of the container taken along line XIII—XIII' in FIG. 11.

Each side 23 has an equilateral trapezoidal shape as illustrated in FIG. 9. The height H of the four-cornered stand 20 is preferably less than 10 mm. The distance D (see FIGS. 6 and 8) between each furrow is preferably less than 1 mm. The angle of inclination X (see FIG. 9) formed by each side 21 and base 24 is preferably between about 10° to 70°. Preferably, the cross-sectional area of each furrow 21A, 22A, 22B (i.e., the area defined within the furrow) is less than 2 mm². The length L (see FIG. 7) of top 22 is preferably greater than 1.5 times as long as the liquid crystal injection hole of the prescribed liquid crystal cell 4.

As shown in FIGS. 10–13, container 10 is rectangular, and projection 11 is formed between internal base 12 and sides 15 of container 10. Projection 11 is shaped and sized to fit base 24 of four-cornered stand 11, thereby securing the four-cornered stand 11 from moving.

When four-cornered stand 20 is secured in container 10 and the liquid crystal material 4 is poured into container 10, the liquid crystal material 4 flows by means of capillary action to the top through furrows 21A formed in sides 21 of stand 20. Generally, proposing that surface tension of a certain material is γ, density is ρ, and r is the diameter of the furrow, the rise height H is as follows:

$$H = \frac{2\gamma}{r\rho g} \cos\theta$$

Figure 14:
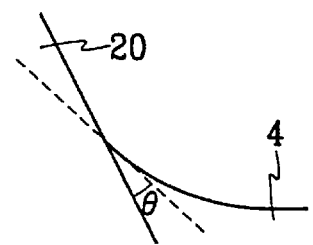
FIG. 14 is an exploded view of a border between the stand and the liquid crystal material.

As illustrated in FIG. 14, θ is an angle formed by surface tension of four-cornered stand 20 and the liquid crystal material 4, and g is a gravity constant. As noted in the above-described expression, the smaller the cross-sectional area of the furrow is and the lesser the contact inclination is, the higher the rise height is.

The liquid crystal material moves up to the top of the four-cornered stand 20 and gathers together in and over the plurality of linear, intersecting furrows 22A, 22B. Furrows 22A, 22B are crossed to form the net shape so that the liquid crystal material, which moves up along the furrows on both sides 21, is dispersed uniformly on the top even if an alien substance is disposed in certain furrows formed on one side such that it blocks flow of the liquid crystal material through such furrows.

Figure 15A:
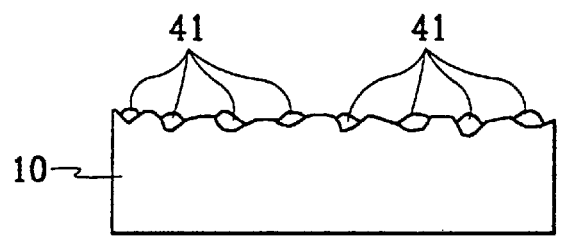
FIG. 15a is a schematic, side view of the container and air bubbles in the liquid crystal material attached to an irregular surface of the container.
Figure 15B:
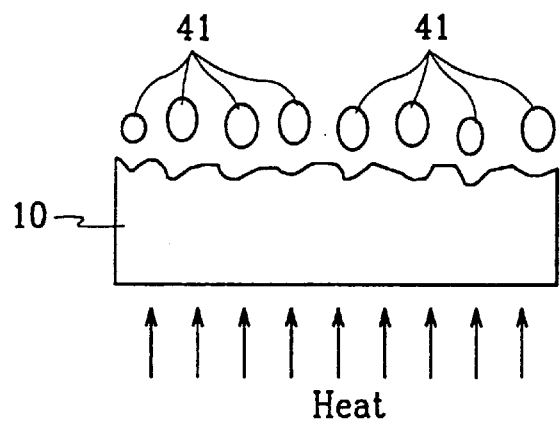
FIG. 15b is a schematic, exploded side view of the air bubbles detached from the container.
Figure 16:
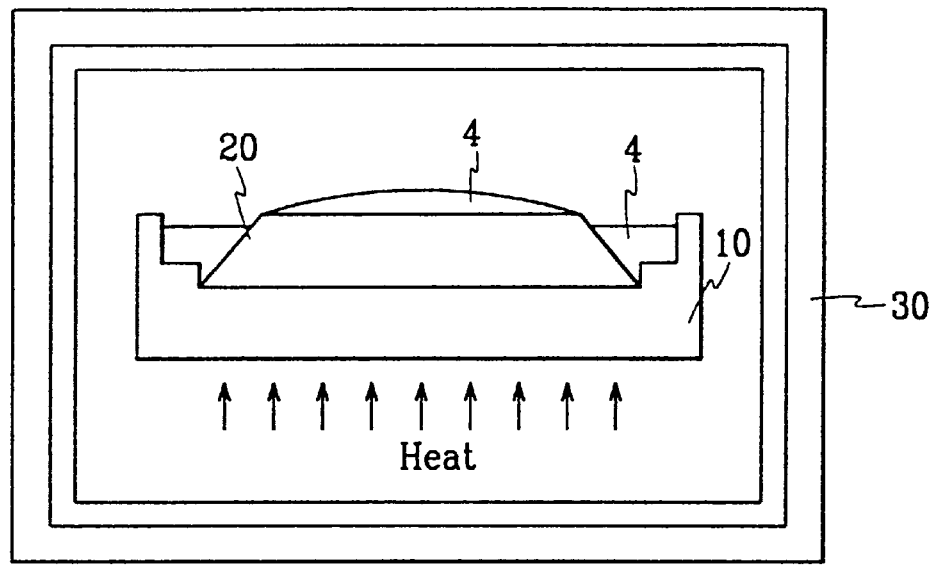
FIG. 16 is a schematic, side view illustrating the heating of the liquid crystal material in an oven according to the preferred embodiment of the present invention.

With reference to FIGS. 15a to 16, a preferred method according to the present invention for injecting the liquid crystal material may be practiced as follows.

First, stand 20 is mounted in container 10 as shown in FIG. 16 and as described above. The liquid crystal material 4 is poured from a barrel into container 10. Preferably, less than 10 cc of the liquid crystal material 4 is poured into container 10. Then, the liquid crystal material 4 contained in container 10 flows to top 22 through furrows 21A formed on the sides 21 of furrows 22A, 22B. The liquid crystal material on the top rises higher due to the surface tension and the liquid crystal material in each upper surface furrow gathers together, thereby being dispersed uniformly.

As illustrated in FIG. 15a, air bubbles may remain on the border between the container 10 and the liquid crystal material 4 because the container 10 is not perfectly smooth and has a rugged surface. It is desirable that these air bubbles be removed from the liquid crystal material 4 prior to injecting the material into the vacant cell. As illustrated in FIG. 16, container 10 containing the liquid crystal material 4 and the stand 20 are heated in an oven. The liquid crystal material 4 is heated over the liquid crystal-isotropic phase transition temperature so that it becomes isotropic. The air inside the liquid crystal material 4 is removed from the liquid crystal material 4 in bubbles because the solubility of air is reduced if kept in the isotropic state for between about 10 to 60 minutes. Gas bubbles in the border between the liquid crystal material 4 and container 10 detach from the border as a result of the expansion of bulk, whereby the gas is removed from the liquid crystal material 4 and a part thereof is melted into the liquid crystal material (Refer to FIG. 15b). Preferably, the isotropic state maintenance time is properly controlled to prevent the liquid crystal material 4 itself from evaporating.

Figure 17:
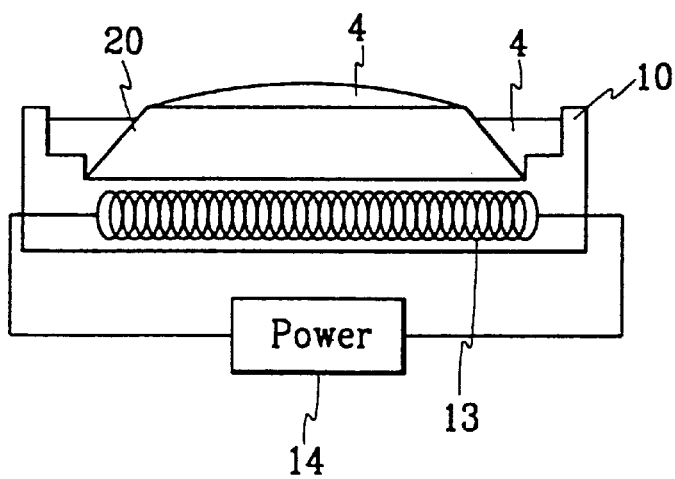
FIG. 17 is a schematic, side view illustrating a container having built-in hot-wires according to the preferred embodiment of the present invention.

With reference to FIG. 17, instead of heating the liquid crystal material in the oven, the liquid crystal material may be heated by mounting hot wire 13 in the thickened base of container 10. Hot wire 13 is connected to power source 14. The liquid crystal material contained in the container 10 is heated by the hot wire, thereby rendering the liquid crystal material 4 to the isotropic state.

Figure 18:
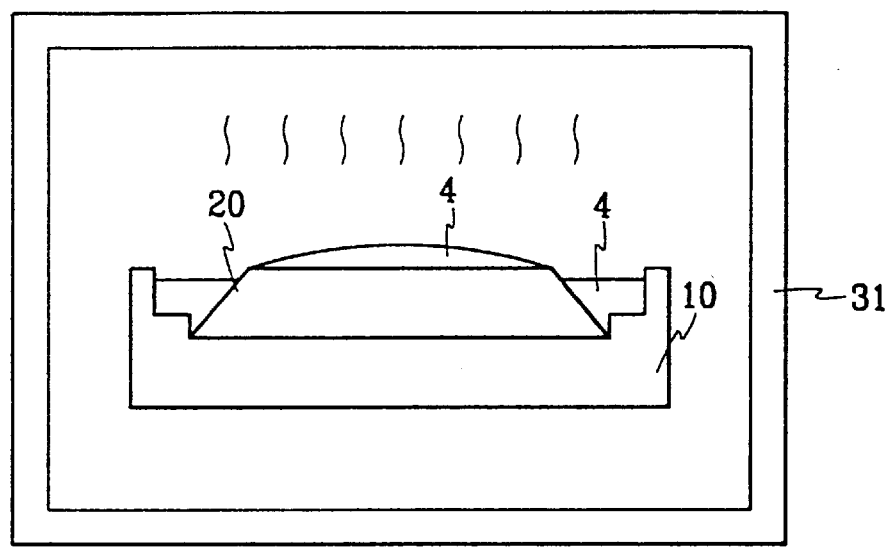
FIG. 18 is a schematic, side view illustrating, in a vacuum chamber, the removal of the air from the liquid crystal material according to the preferred embodiment of the present invention.

As illustrated in FIG. 18, the liquid crystal material 4 is cooled to room temperature. The container containing the liquid crystal material 4 and the vacant liquid crystal cell (not shown) having a liquid crystal injection hole are put into vacuum chamber 31. The pressure in chamber 31 is reduced to $10^{-4}$ torr. The air in the liquid crystal material 4 is removed from the liquid crystal material 4. The pressure time is controlled such that several air bubbles cannot come to the top of the liquid crystal material and combine. Preferably, the pressure in chamber 31 is slowly reduced to about $10^{-3}$ torr for 30 to 90 minutes, and again the pressure in chamber 31 is vacuumized to $10^{-4}$ torr. The liquid crystal cell 2 is brought into contact with the liquid crystal material 4 gathered on the top of stand 20. The pressure in chamber 40 is thereafter lowered to a normal atmospheric pressure state. The liquid crystal material 4 is thereby injected into the liquid crystal cell by means of the pressure difference between the inside and the outside of the liquid crystal cell 2. The liquid crystal material contained in the container continually rises up to the top of the stand as the injection process is performed.

Instead of cooling the liquid crystal material 4 and returning it to the liquid crystal state, the liquid crystal material 4 is injected into the vacant liquid crystal cell 2 while still in the isotropic state. The viscosity of the liquid crystal material when in the isotropic state is less than when in the liquid crystal state. As a result, the injection may be accomplished more efficiently and in less time even though the pressure difference between the inside and the outside of the liquid crystal cell 2 may be relatively small when injecting the liquid crystal material. In addition, physical damage to the alignment film of the vacant cell is reduced when the viscosity of the liquid crystal material is lowered.

Preferably, the same vacuum chamber is used when removing the air in the liquid crystal material and when injecting the liquid crystal material. Alternatively, the removal of the air may be performed using a deaerator.

As described above, the liquid crystal material contained in the container is injected using capillary action. Contamination to the liquid crystal material is thereby reduced and waste of the liquid crystal material is prevented. In addition, the liquid crystal material can be easily and effectively injected without requiring careful control of the amount of the liquid crystal material provided.

Because the liquid crystal material is maintained in the isotropic state for a predetermined time and a relatively small vacuum is used when removing the air in the liquid crystal material and the air bubbles attached to the surface of the container, less liquid crystal material is wasted and time is saved.

Other embodiments of the invention will be apparent to those of ordinary skill in the art from consideration of the specification and practice of the invention disclosed herein. It is intended that the specification and examples be considered as exemplary only, with the true scope and spirit of the invention being indicated by the following claims.

That which is claimed is:

1. A stand for injecting liquid crystal material, said stand comprising at least one side extending from a lower end to an upper end and a plurality of furrows formed in said at least one side, each said furrow having a lower portion adjacent said lower end and an upper portion adjacent said upper end and arranged and configured to transport by means of capillary action liquid crystal material contacting said lower portion upwardly to said upper portion.

2. A stand for injecting liquid crystal material, said stand comprising:
   a base;
   an upper surface;
   at least one side extending between said base and said upper surface;
   a plurality of side furrows formed in said side and extending between said base and said upper surface, said side furrows adapted to transport liquid crystal material contacting said stand adjacent said base upwardly along said side furrows to said upper surface.

3. The liquid crystal injection stand of claim 2, including at least two said sides each having a plurality of said side furrows formed therein.

4. The liquid crystal injection stand of claim 2, wherein said upper surface includes a plurality of upper surface furrows extending across at least a portion of said upper surface and connected to said side furrows.

5. The liquid crystal injection stand of claim 4, wherein portions of said upper surface furrows intersect one another.

6. The liquid crystal injection stand of claim 5, wherein said upper surface furrows together define an intersecting network of furrows.

7. The liquid crystal injection stand of claim 6, wherein said intersecting upper surface furrows define a plurality of protrusions therebetween, said protrusions each having a planar upper surface.

8. The liquid crystal injection stand of claim 4, wherein each of said side and upper surface furrows has a cross-sectional area of less than 2 $mm^2$.

9. The liquid crystal injection stand of claim 4, wherein said side furrows and said upper surface furrows in cross-section define a saw shaped periphery.

10. The liquid crystal injection stand of claim 2, wherein said side furrows extend substantially parallel to one another.

11. The liquid crystal injection stand of claim 2, having a height from said base to said upper surface of less than 10 mm.

12. The liquid crystal injection stand of claim 2, wherein said side and said base form an angle of between about 10° to 70°.

13. The liquid crystal injection stand of claim 2 wherein said stand has a substantially trapezoidal side cross-sectional shape.

14. A device for injecting liquid crystal material comprising:
   a container for holding the liquid crystal material; and
   a stand mounted in said container and including:
      a base;
      an upper surface;

at least one side extending between said base and said upper surface;

a plurality of side furrows formed in said side and extending between said base and said upper surface, said side furrows adapted to transport liquid crystal material contacting said stand adjacent said base upwardly along said side furrows to said upper surface.

15. The liquid crystal injection device of claim 14, including at least two said sides each having a plurality of said side furrows formed therein.

16. The liquid crystal injection device of claim 14, wherein said upper surface includes a plurality of upper surface furrows extending across at least a portion of said upper surface and connected to said side furrows.

17. The liquid crystal injection device of claim 16, wherein portions of said upper surface furrows intersect one another.

18. The liquid crystal injection device of claim 16, wherein said upper surface furrows together define an intersecting network of furrows.

19. The liquid crystal injection device of claim 18, wherein said intersecting upper surface furrows define a plurality of protrusions therebetween, said protrusions each having a planar upper surface.

20. The liquid crystal injection device of claim 16, wherein each of said side and upper surface furrows has a cross-sectional area of less than 2 mm$^2$.

21. The liquid crystal injection device of claim 16, wherein said side furrows and said upper surface furrows in cross-section define a saw shaped periphery.

22. The liquid crystal injection device of claim 14, wherein said side furrows extend substantially parallel to one another.

23. The liquid crystal injection device of claim 14, having a height from said base to said upper surface of less than 10 mm.

24. The liquid crystal injection device of claim 14, wherein said side and said base form an angle of between about 10° to 70°.

25. The liquid crystal injection device of claim 14, wherein said container includes a projection for fixing said stand.

26. The liquid crystal injection device of claim 14, wherein said container includes hot wires mounted in a container base thereof.

27. The liquid crystal injection device of claim 14, wherein the length of said upper surface of said stand is at least 1.5 times as large as a prescribed liquid crystal injection hole of a vacant liquid crystal cell into which the liquid crystal material is to be injected.

28. A method for injecting a liquid crystal material into a liquid crystal cell having a liquid crystal injection hole, said method comprising the steps of:

providing a liquid crystal material injection device including a container and a stand mounted in the container and including an upper surface and at least one side having a plurality of furrows formed therein, the furrows adapted to transport the liquid crystal material contacting lower portions of the furrows upwardly to the upper surface;

placing the liquid crystal material into the container such that at least a portion of the liquid crystal material contacts the lower portions of the furrows, and is transported upwardly along the furrows to the upper surface and collects on the upper surface; and injecting the liquid crystal material into the vacant liquid crystal cell by contacting the liquid crystal injection hole of the liquid crystal cell with the liquid crystal material collected on the upper surface of the stand.

29. The liquid crystal injection method of claim 28, wherein said injecting step includes the steps of:

placing the container containing the liquid crystal material and the liquid crystal cell in a vacuum chamber;

vacuumizing the vacuum chamber, contacting the injection hole of the liquid crystal cell to the liquid crystal material collected on the upper surface of the stand; and raising the pressure of the vacuum chamber.

30. The liquid crystal injection method of claim 29, further comprising the step of placing the liquid crystal material in an isotropic state before said injecting step.

31. The liquid crystal injection method of claim 29, further comprising the step of removing air bubbles formed in the liquid crystal material by vacuumizing the liquid crystal material before the injecting step.

32. The liquid crystal injection method of claim 31, further comprising the step of heating the liquid crystal material over a liquid crystal-isotropic transition temperature before said air removal step.

33. The liquid crystal injection method of claim 32, wherein said heating step is performed using hot wires mounted in the container.

34. The liquid crystal injection method of claim 32, wherein the liquid crystal material is heated in an oven in said heating step.

35. The liquid crystal injection method of claim 32, further comprising the step of maintaining the liquid crystal material in the isotropic state for from about 10 to 60 minutes.

36. The liquid crystal injection method of claim 32, wherein said air removal step further includes the steps of:

placing the liquid crystal material into the vacuum chamber; and removing the air formed in the liquid crystal material by vacuumizing the vacuum in the vacuum chamber to between about $10^{-1}$ to $10^{-3}$ torr.

37. The liquid crystal injection method of claim 36, wherein said vacuumizing step is performed for between about 30 to 90 minutes.

38. The liquid crystal injection method of claim 37, further comprising the step of raising the vacuum degree in the vacuum chamber from between about $10^{-1}$ to $10^{-3}$ torr to about $10^{-4}$ torr.

39. The liquid crystal injection method of claim 32, further comprising the step of cooling the liquid crystal material below a liquid crystal-isotropic transition temperature.

* * * * *